No. 731,807. PATENTED JUNE 23, 1903.
N. NEWMAN.
WEIGHING SCALE.
APPLICATION FILED MAY 4, 1903.
NO MODEL.
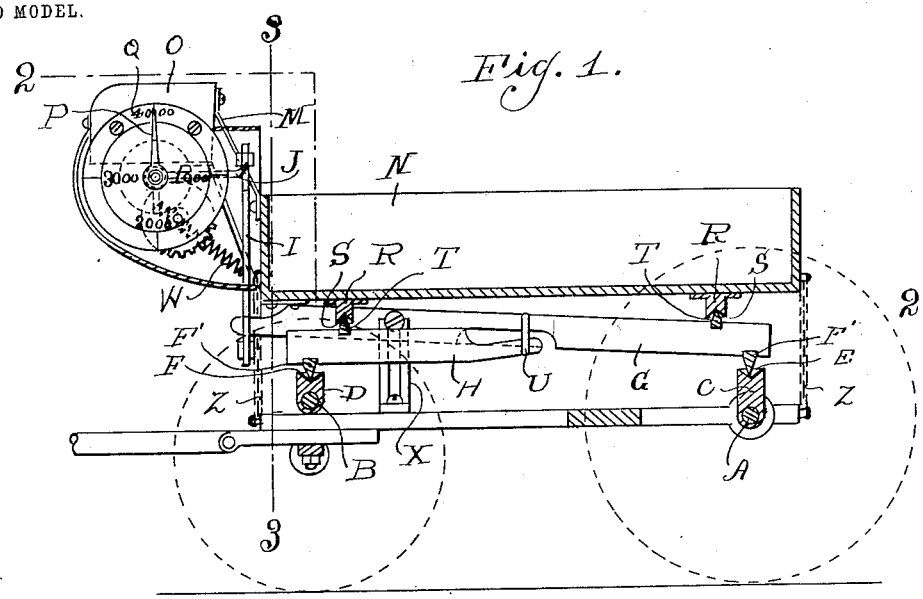
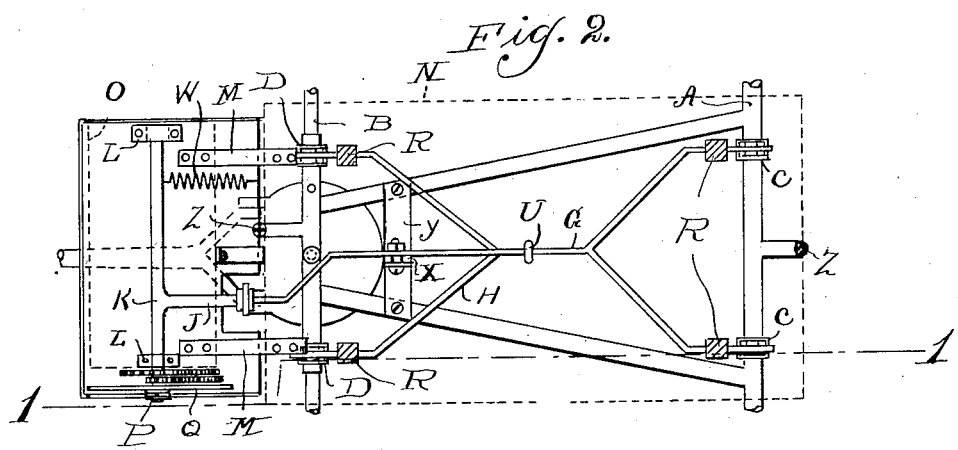
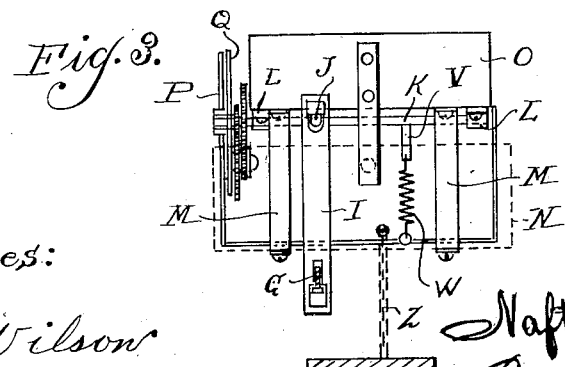
Witnesses:
E. F. Wilson
C. J. Lotz
Inventor:
Naftaly Newman
By Rudolph Wm. Lotz
Attorney.

No. 731,807.

Patented June 23, 1903.

UNITED STATES PATENT OFFICE.

NAFTALY NEWMAN, OF CHICAGO, ILLINOIS.

WEIGHING-SCALE.

SPECIFICATION forming part of Letters Patent No. 731,807, dated June 23, 1903.

Application filed May 4, 1903. Serial No. 155,676. (No model.)

*To all whom it may concern:*

Be it known that I, NAFTALY NEWMAN, a citizen of the United States, residing at Chicago, in the county of Cook and State of Illinois, have invented certain new and useful Improvements in Weighing-Scales; and I do hereby declare the following to be a full, clear, and exact description of the invention, such as will enable others skilled in the art to which it appertains to make and use the same.

My invention relates to a novel construction in a vehicle of which the box is mounted on devices which form a weighing-scale to record the weight of the contents of such box, the object being to provide simple and efficient means for weighing such contents; and it consists in the features of construction and combinations of parts hereinafter fully described and claimed.

In the accompanying drawings, illustrating my invention, Figure 1 is a vertical longitudinal section of a vehicle constructed in accordance with my invention on the line 1 1 of Fig. 2. Fig. 2 is a plan section of same on the line 2 2 of Fig. 1. Fig. 3 is a vertical transverse section on the line 3 3 of Fig. 1.

Referring now to said drawings, A is the axle of the rear wheels, and B is a transverse beam or rod supported on the fifth-wheel of the vehicle. Mounted on said axle A is a pair of pivoted arms C, and on said rod B is a pair of rigid arms D, said arms C and D being provided in their upper ends with V-shaped recesses E and F, which receive the knife-edge fulcrums F' of levers G and H, respectively. Each of said levers consists of a bar provided at one end with diverging arms carrying said knife-edge fulcrums. The said lever G is connected at its free end by means of a link I with the arm J of a shaft K, journaled in bearings L, supported on brackets M on the forward end of the box N, said brackets also supporting the seat O. Said shaft K is suitably geared to a hand P, indicating on a dial Q at one side of the seat. The said box N is supported on the said levers G and H, being provided on its bottom with studs R, having V-shaped recesses S in their lower ends, which receive knife-edge fulcrums T, carried by the said levers G and H, said fulcrums T being situated adjacent the fulcrums F', but slightly nearer the free ends of said levers, so that the weight of the said box N and contents will tend to depress said free ends of said levers. The said lever H is connected at its free end with the middle portion of said lever G by means of a link U, so that the load on said lever H is transmitted to the lever G. Said shaft K is provided with a downwardly-extending arm V, which is connected with one end of a tension-spring W, connected at its other end with said box N, so that said shaft K can be turned only against the action of said spring, which serves the double purpose of a scale-spring and cushion for said box N.

As before stated, the arms C are pivoted on the axle A, as the relative positions of the levers G and H are such that in turning on their fulcrums they move relatively endwise. To prevent longitudinal swinging of said levers when the vehicle is in motion and relieve said fulcrums from strain, I provide a vertical slotted guide-post X on the frame Y, connecting the rear axle with the fifth-wheel, which receives a projection on the lever G and holds the latter against longitudinal motion.

In order to prevent the box N from being jarred off its supports, I provide chains Z, connecting said box with said frame Y, said chains being so arranged as to partially depress said levers against the action of said spring W when the said box N is empty.

Obviously my said device may also be used as a stationary scale.

I claim as my invention—

1. A scale comprising two levers fulcrumed on supports, a link connecting the free end of one of said levers with the middle portion of the other thereof, a weight-receiving member supported on fulcrums on said levers adjacent the supports of the latter and nearer the free ends of said levers, a shaft journaled in bearings on said weight-receiving member, an arm on said shaft, a tension-spring connected at its ends with said arm and said weight-receiving member, a second arm on said shaft, a link connecting said arm with the free end of said second lever, and weight-recording devices actuated by said shaft.

2. A scale comprising a plurality of supports, a pair of oppositely-disposed levers fulcrumed at one end on said supports, a link connecting the free end of one lever with the middle portion of the other lever, a weight-receiving member supported on said levers adjacent the fulcrums thereof and adapted to depress the free ends thereof, a revoluble member journaled in bearings on said weight-receiving member, a spring connecting said weight-receiving member with said revoluble member and adapted to hold the latter normally in a given position, weight-recording devices actuated by said revoluble member, and connection between said revoluble member and said last-named lever, substantially as described.

3. A scale comprising two rigid and two swinging supports, a long lever fulcrumed at one end on said swinging supports, an oppositely-disposed short lever fulcrumed on said rigid supports and connected at its free end with the middle portion of said long lever, a projection on said long lever between its ends, a rigid vertically-slotted guide receiving said projection and adapted to hold said long lever against longitudinal movement, a weight-receiving member mounted on said levers between their ends, weight-recording devices on said weight-receiving member, a spring connected at one end with said weight-receiving member and at its other end with said weight-recording devices, and connection between said weight-recording devices and the free end of said long lever to actuate the former against the action of said spring.

In testimony whereof I affix my signature in presence of two witnesses.

NAFTALY NEWMAN.

Witnesses:
RUDOLPH WM. LOTZ,
ERWIN J. LOTZ.